United States Patent Office 3,029,674
Patented Apr. 17, 1962

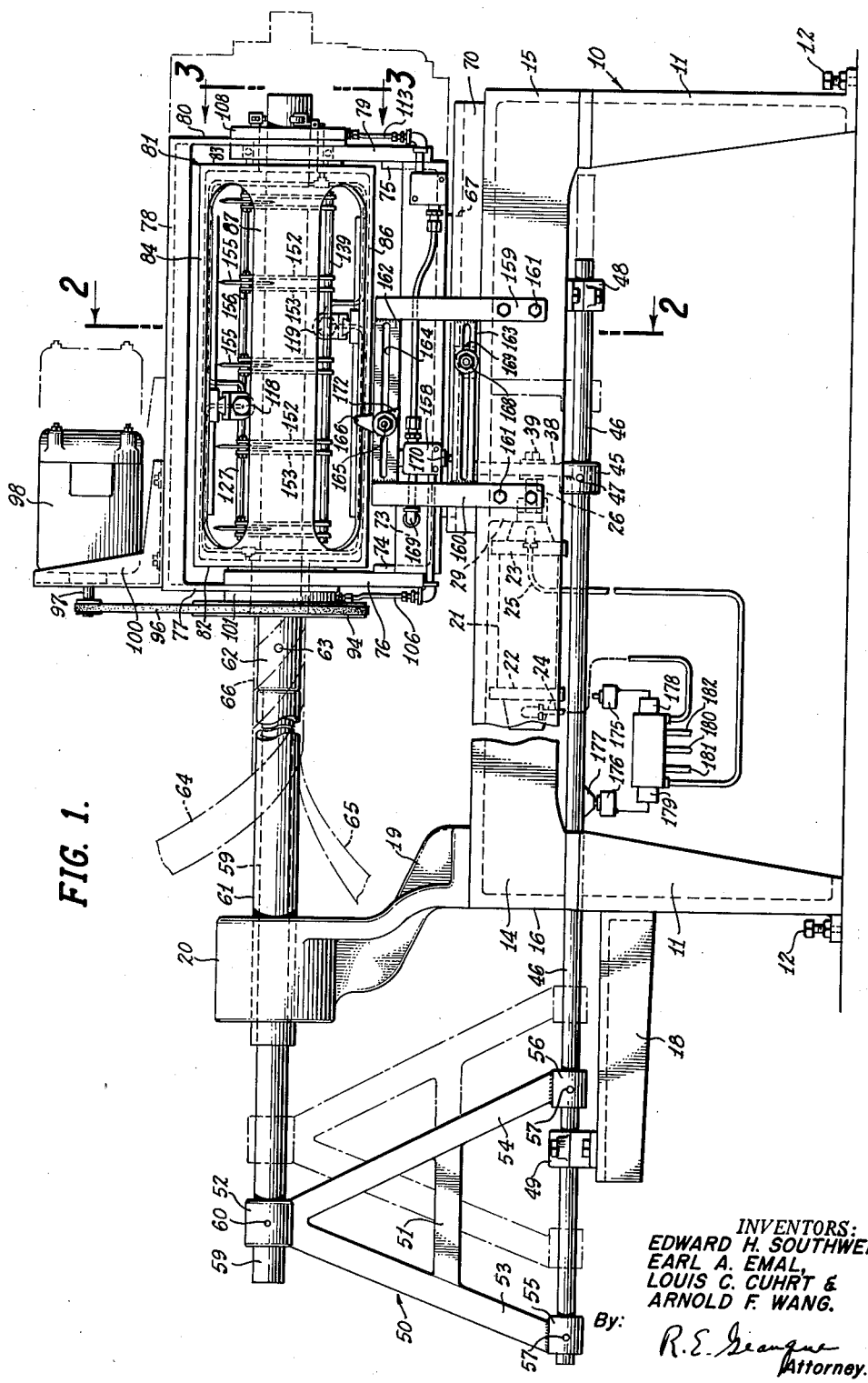

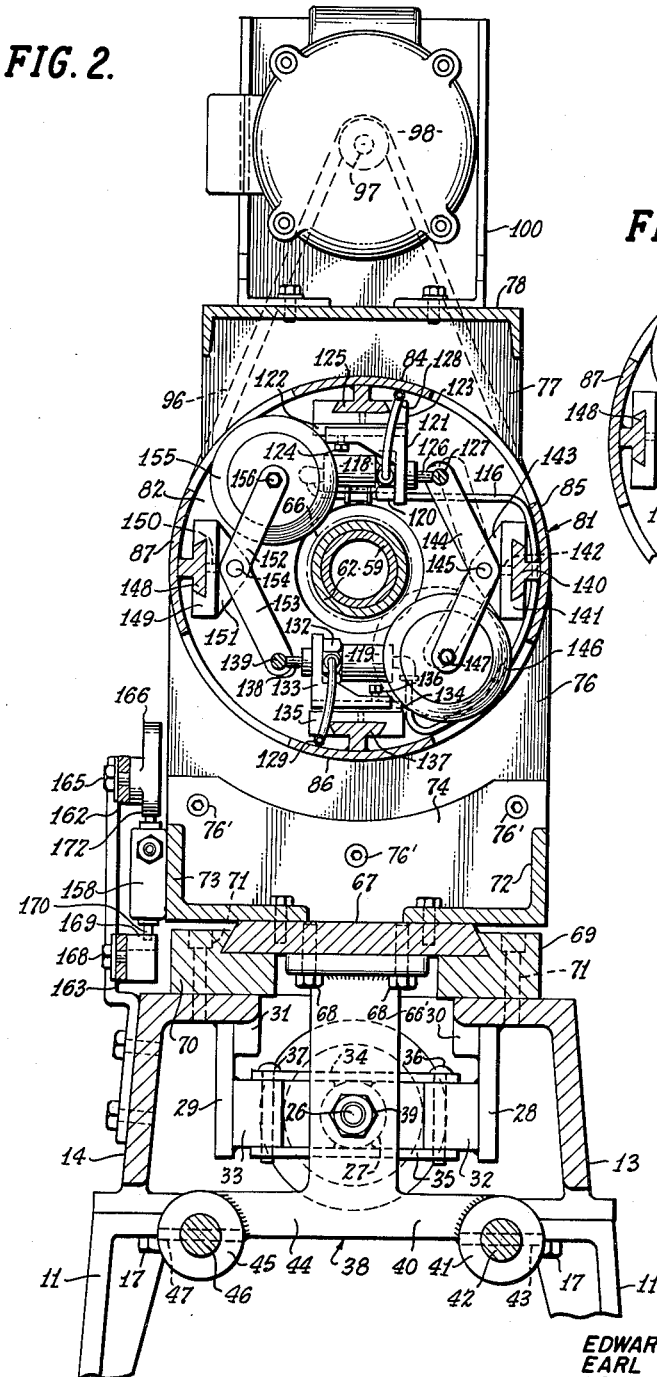
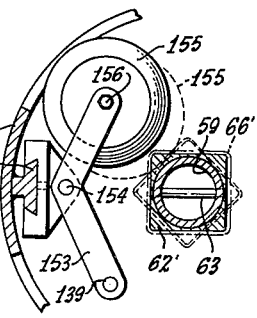

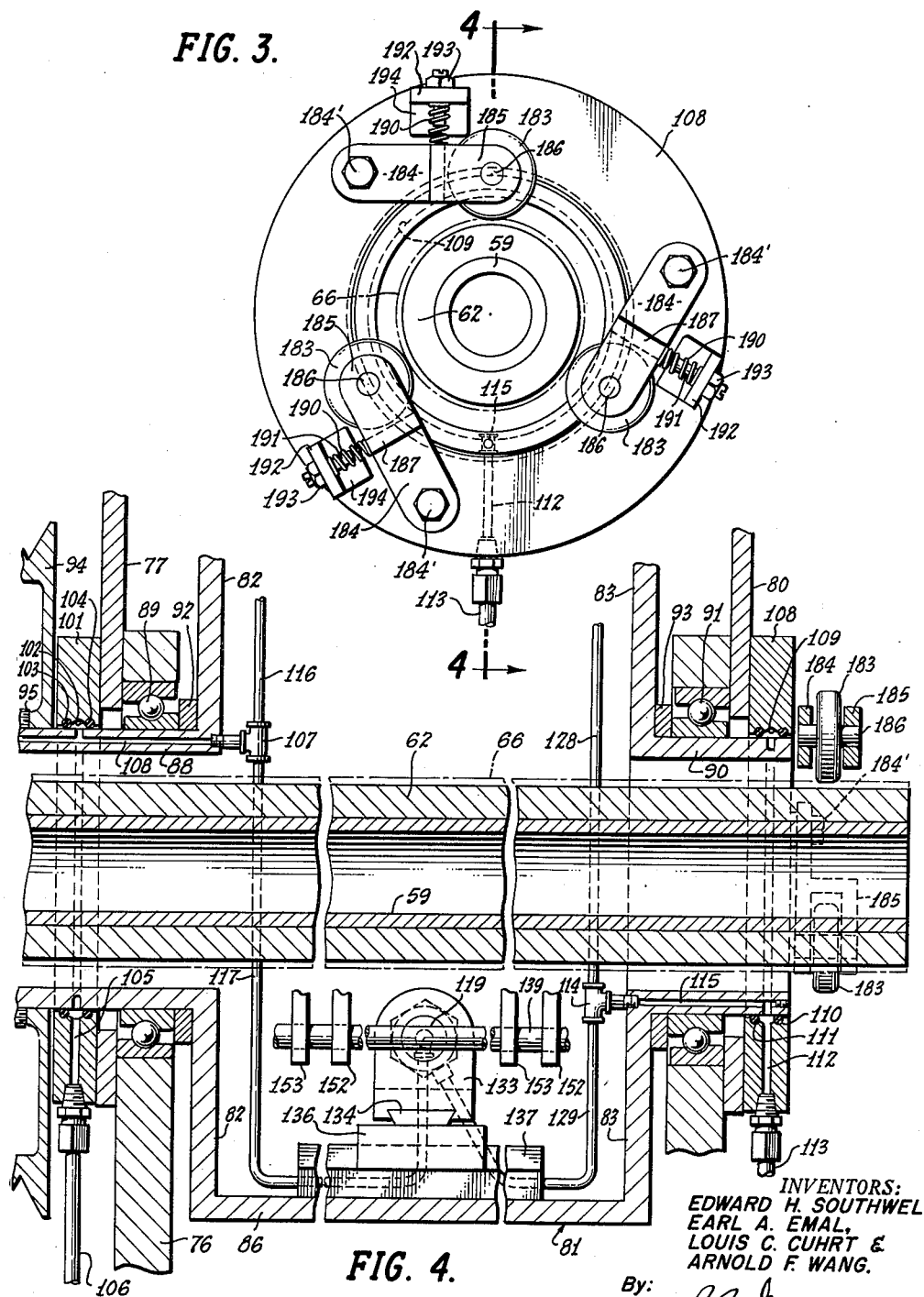

3,029,674
TUBE CUTTING MACHINE
Edward H. Southwell, Los Angeles, Earl A. Emal, Lakewood, Louis C. Cuhrt, Maywood, and Arnold F. Wang, Los Angeles, Calif., assignors to E. H. Southwell Company, Los Angeles, Calif., a corporation of California
Filed July 26, 1956, Ser. No. 600,274
15 Claims. (Cl. 82—71)

This invention relates to a tube cutting machine and more particularly to a tube cutting machine for use in severing container tubes into the desired lengths after the tube has been formed by a continuous forming operation.

Machines of this type presently in use utilize stationary cutting knives and the continuous tube material is fed into the machine on a rotating mandrel which rotates the tube against the stationary knives in order to sever the tubes into the desired lengths. These cutting machines are constructed as an integral part of the tube forming machine since the cutting knives must be specially located for each shape of tubing. Also, since the knives are stationary, the size and shape of the rotating mandrel can not be varied without changing the position of the knives and, of course, with stationary knives, only a circular mandrel can be utilized for cutting circular tubing. Since the tube cutting machine is directly connected with the tube forming machine, it is practically impossible to utilize the tube cutting machine with a variety of tube forming machines to obtain flexibility in its use.

By the present invention, the formed tubing is transmitted to a non-rotating mandrel, either directly from the tube forming machine as the continuous tubing is formed or from some other source, and a plurality of knives are rotated about the mandrel in order to cut the tubing into the desired lengths. In order to provide a continuous cutting operation, the knives and the mandrel supporting the tubing can be moved together during the time the knives are engaged in the cutting operation so that continuous feeding of the tubing onto the mandrel can be maintained during the cutting operation. After the tubing on the mandrel has been cut into the proper length, the cut tubing is pushed off of the end of the mandrel and the knives and mandrel are moved in a reverse direction to be opposite an uncut portion of the tubing material. It is apparent that the reverse movement of the mandrel and the knives relative to the tubing can be so timed to permit sufficient tubing for the next cutting operation to be fed onto the mandrel by the time the knives and mandrel are returned to their original position. Thus, the knives can again be closed after the return movement and a continuous cutting operation is obtained without any interruptions in the reciprocating movement of the knives and the mandrel. The machine of the present invention is equally adaptable to intermittent feed of the tubing material and in such case, the knives and mandrel need not be mounted for reciprocating movement. Since the tube cutting machine is capable of being used with various types of tube feeding to the machine, a large degree of flexibility is available in the various uses of the machine.

An important feature of the present invention resides in the fact that the rotating knives are forced against the tubing during the cutting operation by fluid pressure so that the knives can follow any contour of mandrel and tubing. Thus, it is seen that the knives can be used with mandrels and tubing of various shapes, such as square, oblong, rectangular, etc., without damage to the knives and the same machine can thus be utilized with a variety of tube forming or feed machines which handle various shapes and sizes of tubing material. Also, by using fluid pressure to hold the knives in engagement with the tubing, damage to the knives and mandrel can be prevented since the pressure with which the knives are forced against the mandrel at the end of the cutting operation can be regulated.

It is therefore an object of the present invention to provide a tube cutting machine in which the mandrel for receiving the uncut tubing is non-rotating and the knives for cutting the tubing are rotatable about the mandrel to engage the tubing and cut the tubing into desired lengths.

Another object of the present invention is to provide a tube cutting machine in which the cutting knives are revolvable about a mandrel carrying the uncut tubing and the knives are forced into engagement with the tubing by fluid pressure so that the knives can follow any selected shape of mandrel and tubing.

A further object of the invention is the provision of a tube cutting machine having a bodily movable, non-rotating mandrel and rotating knives and in which the uncut tubing can be continuously fed onto the mandrel so that the mandrel and rotating knives can move with the tubing during the cutting operation and can move in the reverse direction to receive additional uncut tubing for the cutting operation.

A still further object of the invention is to provide a tube cutting machine which can receive uncut tubing from any feeding device onto a non-rotatable mandrel of any desired tube shape so that the tube cutting machine is flexible in its applications to tube feeding machines.

These and other objects of the invention not specifically set forth above will become readily apparent from the accompanying description and drawings in which:

FIGURE 1 is a side elevational view of the tube cutting machine of the present invention and illustrating the mandrel and the rotatable carriage for mounting the cutting knives.

FIGURE 2 is a transverse vertical section along line 2—2 of FIGURE 1 illustrating the actuation mechanism for the rotating knives.

FIGURE 3 is an end elevational view along line 3—3 of FIGURE 1 illustrating the rollers for supporting the end of the mandrel.

FIGURE 4 is a vertical section along line 4—4 of FIGURE 3 showing the manner in which compressed air is introduced to the actuating cylinders for the rotating knives.

FIGURE 5 is a partial vertical section similar to FIGURE 2 illustrating the manner in which the knives act against a square mandrel.

Referring now to FIGURE 1 which illustrates one embodiment of the present invention, the tube cutting machine is shown supported by a frame 10 having four angularly shaped legs 11 with flanges at the upper ends and leveling screws 12 at the low ends. The frame 10 also has side members 13 and 14 secured to end members 15 and 16 and the lower flanges of these members are secured to the upper flanges of the legs by bolts 17 in order to hold the frame rigidly together. A platform 18 extends between the two legs 11 at one end of the frame and is secured to both of the legs in any desired manner. Also, a support member 19 is secured to the top of the side members 13 and 14 at the same end of the frame by any suitable means and terminates in a bearing support 20 positioned along the longitudinal center line of the frame and above the frame. Thus, the platform 18 and the support member 19 also add to the rigidity of the frame.

A fluid motor 21 is rigidly secured to the top flanges of the sides 13 and 14 by means of rings 22 and 23 and fluid passages 24 and 25 are connected to opposite ends of the motor for purposes later to be described. A piston rod 26 extends at one end of the fluid motor 21 and is supported in a bearing 27 for reciprocal movement. The bearing 27 is rigidly supported by members 28 and 29 secured, respectively, to the upper flanges of the sides 13 and 14 by welding or in any other suitable manner. The upper flanges also have projections 30 and 31, respectively, to aid in the support of the members 28 and 29. Lugs 32 and 33 are carried by members 28 and 29, respectively, and extend towards the center of the frame to support cross members 34 and 35 positioned on opposite sides thereof. The cross members are secured to the lug 32 by a bolt 33 and are secured to the lug 33 by a bolt 37 and the bearing is secured centrally of the cross members in order to support the motor shaft 26 during its movement. The end of shaft 26 is rigidly secured to an inverted T-shaped member 38 by means of nut 39 and arm 40 of member 38 carries a ring 41 at its end to receive rod 42 which is rigidly retained in the ring by means of pin 43. The other arm 44 of member 38 likewise carries a ring 45 which receives a rod 46 which is secured within the ring by means of a pin 47. The rods 42 and 46 extend longitudinally along the frame and extend from one end of the frame. Each rod is supported by a bearing 48 secured to each side member of the frame and by a bearing 49 carried by the platform 18 so that upon movement of the piston rod 26 the rods 42 and 46 will be reciprocated lengthwise of the frame 10.

A V-shaped frame 50 has two V-shaped sides 51 (only one of which is shown) which connect at their apex to a ring member 52. The legs 53 and 54 of each side 51 are secured to rings 55 and 56, respectively, and the rings on one side of frame 50 are secured by pins 57 to shaft 46 while the rings of the other side are likewise secured to the shaft 42. The ring member 52 at the apex of the frame 50 receives shaft 59 which is pinned thereto by means of pin 60. It is thus apparent that upon reciprocation of the shafts 42 and 46 and member 38 by motor 21, the frame 50 will transmit this movement to the shaft 59 which is located at the longitudinal center of the frame 10. The shaft 59 extends through and is slidably supported by a cylindrical tube 61 which is rigidly held in the bearing support 20 and the end of the shaft 59 opposite the ring 52 is secured to mandrel 62 by means of a pin 63. In the full line position of the frames 38 and 50 of FIGURE 1, it is seen that the shaft 59 is at one end of its travel since the mandrel 62 is in abutment with the end of the sleeve 61. The sleeve 61 serves as the support upon which a spiral wound tubing can be continuously formed as the mandrel 62 moves to its dotted line position in FIGURE 1. Any suitable spiral tube forming machine can be positioned adjacent the support member 19 in order to form the material segments 64 and 65 onto continuous spiral tubing 66. One well known form of such machine utilizes rubber belting for passing the tubing material around sleeve 61.

The frame 38 has a leg 66' carrying a flange which is bolted to slide 67 by means of bolt 68 and the slide 67 is supported by groove members 69 and 70 which are secured, respectively, to the upper flanges of sides 13 and 14 by means of bolts 71. The members 69 and 70 extend lengthwise of the frame 10 in order to permit reciprocation of the slide 67 lengthwise of the frame. The slide 67 carries at opposite sides thereof, the angle members 72 and 73 which extend beyond each end of the slide and have end members 74 and 75 at opposite ends which are somewhat raised over the angle members 72 and 73. The end member 74 supports a mounting plate 76 by means of bolts 76' and the mounting plate 76 in turn supports an end plate 77 which is secured at its upper end to the platform 78. In a like manner, the end plate 75 supports a mounting plate 79 and the plate 79 in turn is secured to the end plate 80 which is also secured to the platform 78. It is understood that the mounting plates 76 and 79 and the end plates 78 and 80 have openings for receiving the mandrel 62 and since the mounting plates and platform 78, are secured to the slide 67, those will be reciprocated along with the slide and with mandrel 62 upon movement of the piston rod 26. A circular carriage 81 is comprised of end members 82 and 83 which are connected together by four transverse members 84, 85, 86 and 87 which are equally spaced around the outer circumference of the carriage and provide four openings therebetween longitudinally along the carriage. The end member 82 has a circular extension 88 located around the mandrel 62 and extending through the opening in the mounting plate 76 and through the opening in the end plate 77, and the mounting plate 76 contains ball bearings 89 for rotatively mounting the circular extension 88. In a like manner, the end plate 83 has a circular extension 90 which extends through the openings in mounting plate 79 and end plate 80, and the mounting plate 79 contains ball bearings 91 to rotatively support the circular extension 90. Rings 92 and 93 surrounding extensions 88 and 90, respectively, serve to retain and load the bearings for these extensions.

A pulley 94 is secured to one end of extension 88 by screw 95 and a belt 96 connects pulley 94 with shaft 97 of an electrical motor 98 which is rigidly secured to platform 78 by means of bracket 100 so that the motor can reciprocate with the carriage 81 and the platform 78 while continuously rotating the carriage 81 about the mandrel 62. Also, the extension 88 carries a manifold block 101 which is rigidly supported by the end plate 77 and block 101 contains a groove 102 located between O-rings 103 and 104 in order to provide a closed cavity around the circumference of the extension 88. Block 101 contains a passage 105 which connects groove 102 with stationary passage 106 and groove 102 is also connected with the fitting 107, located within the circular carriage 81, through a passage 108 extending through circular extension 88. Thus, upon rotation of the carriage 81 relative to the end plate 77, fluid pressure can be continually supplied from the passage 106 to the fitting 107 carried by the rotating carriage. In a like manner, extension 90 receives a manifold block 108 which is supported by end plate 80 and contains groove 109 located between O-rings 110 and 111 in order to form a closed cavity around extension 90. The block 108 contains a passage 112 which connects groove 109 with stationary passage 113 and fitting 114 carried by carriage 81 is connected with groove 109 by passage 115 in extension 90 so that fluid pressure can be continually supplied to fitting 114 while the carriage is rotating.

The fitting 107 connects through two passages 116 and 117 with one side of fluid motors 118 and 119, respectively (see FIGURE 2). Motor 118 has a threaded portion 120 which is secured in an opening in support frame 121, which has a grooved surface to receive slide 122 carried by frame member 123 and the frame 121 can be fixed in any position along the slide 122 by set screw 124. A slide 125 is received by a groove in member 123 and is attached to transverse member 84 in order to position slide 125 perpendicularly to slide 122 so that the support frame 121 and motor 118 can be positioned both longitudinally and transversely of the carriage 81. Shaft 126 of the fluid motor 118 is located opposite cross bar 127 extending longitudinally along the carriage 81 so that the bar 127 can be moved by shaft 126. The fitting 114 connects through two passages 128 and 129 with the other ends of the motors 118 and 119, respectively, and thus, it is apparent that the fluid motors 118 and 119 can be reciprocated by fluid pressure supplied from fittings 107 and 114. Motor 119 has a threaded portion 132 which is secured in an opening in support frame 133, which has a grooved surface to receive slide 134 carried by frame member 135 and the frame member 135 can be fixed in any position along slide 134 by set screw 136. A slide 137 is received in a groove in member 135 and is attached to transverse member 86 so that frame 133 and fluid motor 119 can be positioned longitudinally or transversely of the carriage 81. Shaft 138 of the fluid motor 119 is located opposite cross bar 139 in order to move the cross bar. The operation of the controls for the fluid motors 118 and 119 will be described in connection with the operation of the cutting machine.

The transverse member 85 has a slide 140 rigidly secured thereto and the slide receives a plurality of support members 141, each of which can be positioned along the slide longitudinally and secured by a set screw 142. Each of the support members 141 has a projection 143 which pivotally mounts a pair of angular arms 144 on opposite sides thereof by means of pin 145. One end of these arms receives the cross rod 127 and the other ends of each pair of arms receive a cutting knife 146, which is rotatively mounted between the arms by the pin 147. In a similar manner, a slide 148 is secured to the transverse member 87 and a plurality of support members 149 have grooves for receiving slide 148 so that the support members can be secured to the slide at any location by means of a set screw 150. Each of the support mmebers 149 has a projection 151 which pivotally supports a pair of angular arms 152 and 153 on opposite sides thereof by means of a pin 154. One end of the arms 152 and 153 receives cross bar 139 while the other ends of each pair of arms receive a cutting knife 155, which is rotatively mounted between the arms by a pin 156. Referring to FIGURE 1, five pairs of arms 152 and 153 are shown supported by the slide 148 and each pair of arms carry a knife 155, the knives being spaced apart by the distance equal to the tube lengths desired to be cut. Five pairs of knives 146 can also be carried by the arms 144 and slide 140 and each knife 146 can be located opposite a knife 155 so that both knives make the same cut in the tubing material and provide double cutting action.

As previously described, during the cutting action of the tube cutting machine, the carriage 81 will be continually rotated by the motor 98 and uncut tubing material 66 will be continuously fed onto the mandrel 62. When the knives 146 and 155 are in the full line position illustrated in FIGURE 1, they are held away from the tubing 66 on the mandrel by means of centrifugal force because of the fact that the shafts 126 and 138 of motors 118 and 119, respectively, have been retracted by fluid pressure from passages 128 and 129. However, upon actuation of the controls to admit fluid pressure to motors 118 and 119 through passages 116 and 117, respectively, the shafts 126 and 138 will be extended to engage the cross bars 127 and 139, respectively, and force the cutting knives against the tubing material. Since the knives will be rotated by the carriage and the mandrel 62 does not rotate, it is apparent that the knives will cut the tubing into four sections of the desired length while the knives are in the dotted line position shown for knives 146 in FIGURE 2. When the shafts of the fluid motors 118 and 119 are again retracted, the cross bars 127 and 139 will follow these shafts inwardly and the knives will move outwardly because of the centrifugal force acting upon the knives. In the cut position, the knives are located in the spaces between the transverse members of the carriage 81 so that the knives will not be damaged by engaging parts of the carriage. If so desired, a loose, slot connection could be supplied between the shafts of the fluid motors and the cross bars in order to give a positive outward action to the cutting knives.

The passages 106 and 113 connect with a valve body 158 which is secured to side member 73 carried by slide 67 so that the valve body moves with the carriage 81 upon operation of the fluid motor 21. The valve body 158 reciprocates between two support members 159 and 160 which are secured to side member 14 of frame 10 by means of bolts 161 and these support members carry two cross members 162 and 163 which are located, respectively, above and below the valve body 158. The upper cross member 162 contains a groove 164 through which passes a bolt 165 for pivotally mounting limit actuator 166 at any selected position along the cross member 162. The cross member 163 contains a groove 167 through which passes bolt 168 for securing a second limit actuator 169 at any selected position along the cross member 163. A fluid pressure supply passage 169' continually supplies fluid pressure to valve body 158 and the body also has an exhaust passage (not shown). While any suitable fluid can be used, compressed air is preferable since the knives can move against air pressure to follow the contour of various shapes of mandrels. A slidable valve pin 170 is contained in body 158 and is moved up and down by the limit actuators in order to control the motors 118 and 119 and move the knives toward and away from the tubing 66. As the carriage 81 moves toward the dotted line position of FIGURE 1, pin 170 will be moved upwardly by wedge-shaped limit actuator 169 in order to actuate motors 118 and 119 through line 113 to permit the knives to move away from the tubing material. This action of wedge 169 will take place near the end of the stroke of the carriage and before the carriage starts on its return movement to the left towards its full line position of FIGURE 1. During the movement towards the left, the pin 170 will pivot arm 172 of actuator 166 about bolt 165 against a spring (not shown) without movement of pin 170 so that the knives will remain open to the end of the movement to the left. After the carriage has started back to the right towards the dashed line position of FIGURE 1, the pin 170 will again engage arm 172 and will be moved downward since the arm cannot pivot in the opposite direction. This downward movement of pin 170 will connect passages 116 and 117 with fluid pressure to cause knives 146 and 155 to move inwardly and engage the uncut tubing material 66 while the carriage 81 is continually rotating the knives. Thus, the knives will engage the tubing after the carriage starts to move to the right and will disengage the tubing near the end of the movement to the right, thus assuring that the knives will at no time move opposite to the direction in which the uncut tubing is fed. By the use of the limit actuators 166 and 169, it is possible to have the knives in contact with the tubing material during any portion of the movement of the carriage itself towards its dashed line position of FIGURE 1. It is understood that any other suitable mechanism can be utilized to control the inward and outward movement of the knives.

The fluid motor 21 serves to reciprocate carriage 81 and mandrel 62 together and the passages 24 and 25 are connected to valve mechanism 174 which can be of any standard construction capable of reversing the application of fluid pressure to the motor 21 upon movement of the valve. Limit switches 175 and 176 are positioned to engage an actuator member 177 which is carried by the shaft 46 and the switches are connected respectively with solenoids 178 and 179, which upon actuation, serve to move the valve mechanism to reverse motor 21. The valve mechanism 174 receives a fluid pressure supply from passage 180 and passages 181 and 182 serve as exhaust lines for passages 25 and 24, respectively. When member 177 actuates switch 176 at the end of carriage movement to the left, valve mechanism 174 will direct fluid pressure to passage 24 and will exhaust passage 25 in order to move the carriage and mandrel toward the right. When the member 177 actuates switch 175 at the end of carriage movement to the right, valve mechanism 174 will direct fluid pressure to passage 25 and will exhaust passage 24 in order to move the carriage and mandrel toward the left. Thus, by proper location of the limit switches 175 and 176, the length of the stroke of the carriage from the full line to the dotted line position can be controlled. It is understood that any oher suitable type of control system can be utilized to control the direction and amount of movement of carriage 81 and mandrel 62. Also, it is contemplated that such control systems can vary the speed of movement of the carriage and mandrel in either direction and restriction can be incorporated in valve mechanism 174 for this purpose. Further, the control system can provide for a dwell period at the ends of the stroke if so desired.

In order to provide support for the free end of mandrel 62, three rollers 183 are each carried by a pair of arms 184 and 185 which are pivotally connected to the valve block 108 by means of pin 184'. Each pair of arms 184 and 185 are connected together by cross member 187 which receives the pressure at one end of a spring 190. The other end of the spring 190 bears against a collar on pin 191 which is attached to one side 192 of an angularly shaped bracket by means of a nut 193 so that the length of the pin 191 can be adjusted. The other side 194 of the bracket is rigidly secured to the valve body 108 so that each spring 190 continually forces a roller 183 about its pivot pin 184' and into contact with the tubing material 66 on the mandrel 62. Since all of the rollers 183 act with equal force towards the center line of the mandrel 62, the rollers serve to help support the end of the mandrel and keep it in line with its bearing sleeve 61. However, the rollers 183 are not forced against the tubing 66 with sufficient force to prevent the sections of the cut tubing from being pushed off of the end of the mandrel 62. Because of the spring biased pivotal mounting of the rollers, it is apparent that the rollers can accommodate any shape of mandrel 62 and still serve to help support the end of the mandrel. Also, because of the fact that the knives 146 and 155 are held in engagement with the tubing material by air pressure, the knives can move against the pressure in motors 118 and 119 to follow the contour of any selected shape of mandrel and tubing material. In FIGURE 5, there is shown a square shaped mandrel 62' which is secured to shaft 59 by pin 63 and carries square shaped tubing material 66'. The full and dashed line positions of knives 155 illustrate the manner in which the knives can follow the contour of the mandrel while being continuously forced against the tubing material by motors 118 and 119.

The operation of the cutting machine of the present invention will now be briefly described. The spiral wound tubing 66 will be continuously formed onto sleeve 61 and will be moved to the right by the mandrel 62 as it moves to the right of FIGURE 1, with the carriage after actuation of switch 176. After initial movement of the carriage to the right, the limit actuator 166 will move the pin 170 and cause fluid pressure to be directed through lines 106, 116 and 117 to operate the motors 118 and 119, respectively, and cause knives 146 and 155 to move inwardly and engage the uncut tubing being moved to the right on the mandrel. Since the carriage 81 is continuously rotated by the motor 98, the knives 146 and 155 will rotate about the tubing on the mandrel and will move to the right with the mandrel at the same rate of speed. After the knives have moved with the mandrel a sufficient distance to cut the tubing into the desired lengths, as defined by the distance between the knives, the arm 170 of valve body 158 will engage limit actuator 169 and will be moved upwardly to admit fluid pressure to passages 113, 128 and 129 so that the shafts of motor 118 and 119 will retract and permit the knives to move outwardly away from the cut tubing. This outward movement of the knives will occur near the end of the stroke of the carriage to the right where fluid motor 21 will be energized by valve mechanism 174 to return the carriage to the left. During movement to the left, the knives will remain in open position since valve pin 170 will pass by limit actuator 166 without being moved. Thus, the knives will still be open at the end of the stroke to the left and as the carriage again starts to the right, the limit actuator 166 will move the plunger 170 downward to again close the knives.

It is understood that the rate of movement of the carriage to the right in FIGURE 1 will conform with the rate in which the uncut tubing 66 is being fed onto the mandrel from any suitable tube forming machine. During the return movement of the mandrel to the left, the mandrel will slide within the uncut tubing in order to obtain a new length of uncut tubing on the mandrel. For instance, uncut tubing will be fed towards the mandrel 62 as it is moving to the right and this uncut portion will be equivalent in length to the movement to the right of the carriage. Also, upon return of the carriage to the left, a further section of tubing will be fed towards the mandrel, and the movement of the carriage to the left will be so timed that the mandrel will be completely covered with uncut tubing at the time it reaches the end of its stroke to the left. Thereafter, the mandrel will start back again to the right along with the carriage and shortly thereafter the knives will be closed on the uncut tubing to cut four additional sections of the desired lengths. It is understood that the cut section will be moved off the end of the mandrel by abutment with the uncut tubing being fed to the mandrel as the mandrel makes its return movement and that the rate of carriage movement both to the right and to the left in FIGURE 1 can be controlled to provide for continuous reciprocation of the carriage and for the cutting of four lengths of tubing on each movement of the carriage to the right.

By the present invention, cutting knives are provided which are pressed into engagement with the uncut tubing by means of fluid pressure. Thus, it is possible for the knives to cut various shapes of tubing on various shaped mandrels, such as rectangular, square, etc., since the knives will be continually forced against the mandrel and will be permitted to move against the fluid pressure to follow the contour of the mandrel. Therefore, the cutting machine of the present invention can be utilized with tube forming machines of various types which form various shapes of tubing by simply providing a mandrel for the cutting machine having the required cross section. It is also apparent that the feeding of the uncut tubing onto the mandrel could be intermittent so that the required length of tubing for each cutting operation could be fed onto the mandrel 62 after the carriage has returned to the end of its movement to the left and prior to the starting of the cutting movement. Also, it is not necessary that the mandrel and carriage be reciprocated when intermittent feeding is utilized, since uncut tubing can be fed onto the mandrel after each opening of the knives and this feeding operation will remove the cut tubing from the mandrel. The distance between knives and the number of knives can be varied and the setting for the various actuators for the fluid motors can also be varied. Because of the construction of the tube cutting machine, it can be fabricated independently of any tube forming machine and can quickly be adapted for use with various tube forming and tube feeding machines. Various other modifications are contemplated by those skilled in the art without departing from the spirit and scope of the invention as hereinafter defined by the appended claims.

What is claimed is:

1. A tube cutting machine for cutting tubing material into pre-determined lengths comprising a carriage, knife means supported by said carriage, a mandrel extending along said carriage for supporting said tubing material, compressible means for moving said knife means toward said mandrel and holding said knife means in engagement with said tubing material and said mandrel, and means for moving said carriage around said mandrel while said knife means is held in engagement with said tubing material for cutting said tubing material into said pre-determined lengths.

2. A tube cutting machine as defined in claim 1 wherein said knife means comprises a plurality of knives, each of which is supported by an arm movably mounted on said carriage, said compressible means comprising compressible power means acting against said arms to urge said knives into engagement with the tubing maetrial on said mandrel, said knives being movable in opposition to the force of said power means so that the knives can move toward and away from said carriage and follow any desired contour of mandrel and tubing material.

3. A tube cutting machine as defined in claim 2 wherein each of said knives is substantially circular in form and freely rotatably mounted at its axis on one of said arms.

4. A tube cutting machine as defined in claim 1 having means for reciprocating said carriage and said mandrel in the same direction simultaneously and through a selected length of stroke, and means for controlling said compressible means to cause engagement of said knife means with said tubing material during movement of said carriage in one direction and disengagement of said knife means during movement in the opposite direction.

5. A tube cutting machine comprising a bodily movable carriage supporting a plurality of knives in spaced relationship along its length as determined by the desired lengths of cut tubing, means for rotating said carriage and said knives, a mandrel located at the axis of rotation of said carriage and having one end portion extending beyond said knives for continuously receiving uncut tubing material, compressible means for engaging said knives with said tubing material on said mandrel in order to cut said tubing material into the desired lengths during rotation of said carriage, and means for bodily moving said carriage and said mandrel in the same direction simultaneously during rotation of said carriage while said knives are engaged so that uncut tubing material can be continuously fed onto said one end of said mandrel while said knives are engaged.

6. A tube cutting machine as defined in claim 5 wherein said compressible means comprises compressible fluid pressure means against which said knives can move to remain in engagement with said tubing material and follow the contour of said mandrel.

7. A tube cutting machine comprising a hollow carriage means, means for continually rotating said carriage means, mandrel means extending into said carriage and receiving uncut tubing material at one end thereof, knife means carried by said carriage means and movable into engagement with said uncut tubing material on said mandrel means in order to cut said tubing material during rotation of said carriage means, and compressible power means for urging said knife means against said uncut tubing material while permitting said knife means to move towards and away from said carriage.

8. A cutting machine as defined in claim 7 having means for reciprocating said carriage means and mandrel means together in the same direction over a selected distance, control means for controlling said power means to engage said knife means with the tubing material on said mandrel means during movement of said carriage means and mandrel means in one direction and for withdrawing said knife means during movement of said carriage means and mandrel means in the opposite direction, said reciprocation of said carriage means and said mandrel means being timed with the rate said mandrel means receives uncut tubing material so that sufficient uncut tubing material will be on the mandrel means for the next engagement of said knife means upon return of said carriage means and said mandrel means to the end of the movement in the opposite direction.

9. A tube cutting machine as defined in claim 7 wherein said carriage means comprises a circular drum member having a plurality of longitudinal support members, said knife means comprising a plurality of cutting knives pivotally mounted on more than one of said support members, and said power means comprising compressed air means supported on other of said support members, each of said fluid motor means being operative to move the knives supported by one of said members into and out of engagement with the uncut tubing material on said mandrel means, the knives on each of said support members being adjustable along the length of said carriage means in order to cut desired lengths of tubing material on said mandrel means.

10. A tube cutting machine for cutting continuously fed tubing material into pre-determined lengths comprising a platform mounting a frame member, means for reciprocating said frame member, a carriage supported by said frame member and movably mounting a plurality of cutting knives, means for rotating said carriage, a mandrel located along the length of said carriage and supporting said continuously fed tubing material, means for simultaneously reciprocating said mandrel with said frame member and carriage in the same direction, and compressible power means operative during movement of said frame member and carriage in one direction while said carriage is rotating for moving each of said knives into cutting engagement with said tubing material on said mandrel to cut said tubing material into pre-determined lengths and thereafter to move said knife means into non-cutting relationship with said tubing material, said compressible means causing said knives to follow the contour of said tubing material and mandrel.

11. A tube cutting device as defined in claim 10 wherein the other end of said mandrel is supported by a plurality of spring biased rollers acting radially inward on said mandrel, said rollers being supported by said frame member in order to provide support for said other end of said mandrel.

12. A tube cutting machine as defined in claim 11 wherein said one end of said mandrel extends from one end of said carriage to receive uncut tubing material and said other end of said mandrel extends from the other end of said carriage in order to discharge the cut tubing.

13. A tube cutting machine comprising a hollow carriage mounted on a frame for rotation about a central axis, cutting means supported by said carriage for bodily movement relative to said carriage, a non-rotatable mandrel located within said carriage at said central axis for continuously receiving and supporting uncut tubing material, resilient power means for bodily moving said cutting means toward said axis and urging said cutting means into engagement with said tubing material, and means for rotating said carriage about said mandrel while said cutting means are urged against said tubing material by said power means in order to cut said tubing material while the material is supported by said mandrel.

14. A tube cutting machine as defined in claim 13 wherein said cutting means comprises a plurality of freely rotatable circular knives urged against said tubing material by said power means, each of said knives being rotatively mounted at one end of lever means pivotally supported by said carriage at an intermediate point on said lever means, said power means being supported by said carriage and operative upon the other end of said lever means for moving said knives into engagement with said tubing material.

15. A tube cutting machine as defined in claim 13 having means connected to said frame and with said mandrel for simultaneously reciprocating said carriage and said mandrel in the same direction over a selected distance, and means for actuating said power means to engage said cutting means with the tubing material on said mandrel during movement of said carriage and mandrel in one direction and for withdrawing said cutting means during movement in the opposite direction, one end of said mandrel extending beyond said carriage for continually receiving the uncut tubing during reciprocating movement of said carriage and said mandrel.

References Cited in the file of this patent

UNITED STATES PATENTS

| | | |
|---|---|---|
| Re. 20,974 | Guirl et al. | Jan. 10, 1939 |
| 1,698,230 | Hawkins | Jan. 8, 1929 |
| 1,716,424 | Conti | June 11, 1929 |
| 2,186,061 | Berg et al. | Jan. 9, 1940 |
| 2,562,879 | Abbey | Aug. 7, 1951 |

FOREIGN PATENTS

| | | |
|---|---|---|
| 1,012,018 | France | Apr. 9, 1952 |